Patented June 17, 1930

1,764,491

UNITED STATES PATENT OFFICE

CHARLES SEYMOUR ASH, OF SAN FRANCISCO, CALIFORNIA, ASSIGNOR TO CALIFORNIA PACKING CORPORATION, OF SAN FRANCISCO, CALIFORNIA, A CORPORATION OF NEW YORK

STABILIZED PINEAPPLE AND PROCESS FOR PRODUCING THE SAME

No Drawing.  Application filed February 17, 1926.  Serial No. 88,919.

This invention relates to a process for stabilizing or preventing deterioration of canned fruit, such as pineapple and a stabilized and canned pineapple obtained by such process.

The primary object of the present invention is to provide a process for stabilizing canned fruit, such as cooked pineapple, to maintain the taste and color of the product, and to prevent a deterioration of the product upon aging. Another object is to disclose and provide a canned pineapple capable of retaining its color and taste, and otherwise maintaining its stability and original properties upon storage for extended periods of time.

Hitherto, certain foods have been treated with carbon dioxide for the purpose of sterilization of fresh foods and beverages. The purpose of such process has been to substitute carbon dioxide as a preservative in place of heat or cold storage. In other words, the purpose of the prior processes of treating foods with carbon dioxide has been to preserve the foods in a similar manner to that effected by salicylates or benzoates so that the product is rendered imperishable; the microorganisms present being rendered inert or destroyed so that no decomposition takes place. In the treatment of canned fruits, such as cooked pineapple, it has been discovered that the pineapple can be made substantially sterile by the cooking or heating of the fruit to a temperature above 150° F. so that no bacterial action is present. However, after such sterilization of the fruit, it has been found upon aging to undergo certain changes, particularly in the case of pineapple. I have found that within a few months, a loss of the characteristic pineapple taste may be noted and a cooked or boiled taste appears and gradually develops. The loss in taste of the product is often accompanied by change in color from a lighter to a darker yellow or brown. It is, therefore, seen that in the preservation of pineapple, there is no need for the treatment of the same with sterilizing agents, such as carbon dioxide, or other materials mentioned, to sterilize the product itself, since substantially all bacterial action may be prevented by a simple process of heating. However, unless the sterilized pineapple is suitably treated, a substantial deterioration in taste and color takes place, and it is desirable to provide a method for the treatment of the fruit to prevent such deterioration of the sterile material. The treatment of fruit for this purpose is herein termed stabilizing the product.

I have discovered that by exhausting air from the uncooked pineapple or other fruit, so as to remove the natural intercellular atmosphere of the fruit, and then replacing such natural intercellular atmosphere with carbon dioxide, nitrogen or other suitable gas, the aging or deterioration of the subsequently sterilized fruit may be substantially prevented. I have also found that traces of sulfur dioxide added to the carbon dioxide or nitrogen also perform or aid in the function of preventing rapid aging or deterioration, thus further stabilizing the fruit.

Various further objects and advantages of the present invention will be understood from a description of a preferred type of a process embodying the invention. In the preferred mode of practicing the present invention, fresh uncooked or unsterilized pineapple, or like fruit, in open cans or other suitable containers, is placed within a closed chamber. This chamber is then exhausted with a suitable vacuum pump to remove the greater part of the air therein, after which the chamber is filled with carbon dioxide, nitrogen, or other suitable gas under pressure of, for example, 15 pounds per square inch. The process may be repeated by further exhausting the chamber and again filling with carbon dioxide, nitrogen, or other suitable gas at the same pressure. By this procedure, it is found that the fruit, even where otherwise too green, acquires a uniform golden color. After the fruit is thus treated, it may be syruped and passed through an exhaust box in which it is heated by steam and then capped in accordance with the normal practice in cannery operations. After capping, the closed containers are then passed through a sterilizer where the containers and contents are subjected to temperatures of about 140° to 160° F. to sterilize the contents. The heating of syruped fruit in open containers expands the syrup so that the subsequent sterilization of the capped containers does not impose a great strain upon the containers. With the process of the present invention, no attempt need be made to seal the product in an atmosphere of carbon dioxide. Moreover, the process does not employ carbon dioxide or other gas as a medium for sterilizing the fruit or pineapple to prevent bacterial action, as in the usual orthodox heating treatment of the food the same is made sterile.

The basic novelty of the present invention resides in stabilizing the sterilized product by the replacement of the natural intercellular atmosphere of the fruit with a stabilizing gas, such as carbon dioxide, nitrogen or other suitable gas.

While the process herein described is well adapted to stabilize sterile fruits and prevent deterioration thereof, the invention is not limited to the particular details of the process described, but is of the scope set forth in the appended claims.

What I claim is:—

1. The process of treating uncooked pineapple which includes the following operations: (a) exhausting the air from the fruit, (b) replacing the natural intercellular atmosphere of the fruit with a stabilizing gas, (c) syruping the fruit, and (d) sterilizing the fruit with heat.

2. A process of canning pineapple which includes exhausting the air of uncooked pineapple, replacing the natural intercellular atmosphere of the pineapple by a stabilizing gas, syruping the fruit, heating the fruit in open containers exposed to natural atmosphere and capping the containers.

3. A process of canning pineapple to stabilize and retain the flavor thereof comprising, substantially removing the intercellular natural atmosphere present in pared, uncooked pineapple by the use of partial vacuum, replacing such atmosphere with an inert stabilizing gas, then syruping the pineapple, heating the syruped pineapple in open containers exposed to the natural atmosphere, capping the containers and then sterilizing the capped containers and contents with heat.

4. A canned and sterilized pineapple immersed in syrup, said pineapple containing a stabilizing gas only in its intercellular cavities adapted to prevent deterioration in color and taste.

Signed at San Francisco, California, this 6th day of February, 1926.

CHARLES SEYMOUR ASH.